(12) United States Patent
Gilgallon et al.

(10) Patent No.: US 7,654,358 B2
(45) Date of Patent: Feb. 2, 2010

(54) MOTORCYCLE GEAR SHIFT CONTROL

(76) Inventors: John Gilgallon, 8326 Golfside, Commerce, MI (US) 48388; George Faleris, 1296 W. U.S. 2, St. Ignance, MI (US) 49781

( * ) Notice: Subject to any disclaimer, the term of this patent is extended or adjusted under 35 U.S.C. 154(b) by 234 days.

(21) Appl. No.: 11/578,174

(22) PCT Filed: Apr. 8, 2005

(86) PCT No.: PCT/US2005/011900
§ 371 (c)(1),
(2), (4) Date: Oct. 11, 2006

(87) PCT Pub. No.: WO2005/100143
PCT Pub. Date: Oct. 27, 2005

(65) Prior Publication Data
US 2007/0144807 A1    Jun. 28, 2007

Related U.S. Application Data

(60) Provisional application No. 60/560,389, filed on Apr. 8, 2004.

(51) Int. Cl.
*B62M 7/00* (2006.01)
*G05G 9/00* (2006.01)
(52) U.S. Cl. .................... 180/230; 74/473.16
(58) Field of Classification Search ............... 180/230; 74/77, 473.16; 280/291, 294
See application file for complete search history.

(56) References Cited

U.S. PATENT DOCUMENTS

| | | | | | |
|---|---|---|---|---|---|
| 2,309,281 | A | * | 1/1943 | Steele | 403/77 |
| 2,583,382 | A | * | 1/1952 | Maas | 384/558 |
| 2,766,079 | A | * | 10/1956 | Browne | 384/209 |
| 3,439,661 | A | * | 4/1969 | Weiler | 123/90.16 |
| 5,507,200 | A | * | 4/1996 | Reed et al. | 74/473.16 |
| 5,661,999 | A | * | 9/1997 | Carone | 74/473.16 |
| 5,662,195 | A | * | 9/1997 | Rush | 192/3.51 |
| 6,394,214 | B1 | * | 5/2002 | Hahm | 180/230 |

* cited by examiner

Primary Examiner—Tony H. Winner
(74) Attorney, Agent, or Firm—The Weintraub Group, PLC

(57) ABSTRACT

A foot operated gear-shift assembly, gear shift conversion kit, and method for converting the shifting gears of a conventional motorcycle, all-terrain vehicle, and like vehicle wherein the heel and toe shift elements of the conventional rocker-arm gear shift assembly are separated and pivot about separate pivot axes.

16 Claims, 4 Drawing Sheets

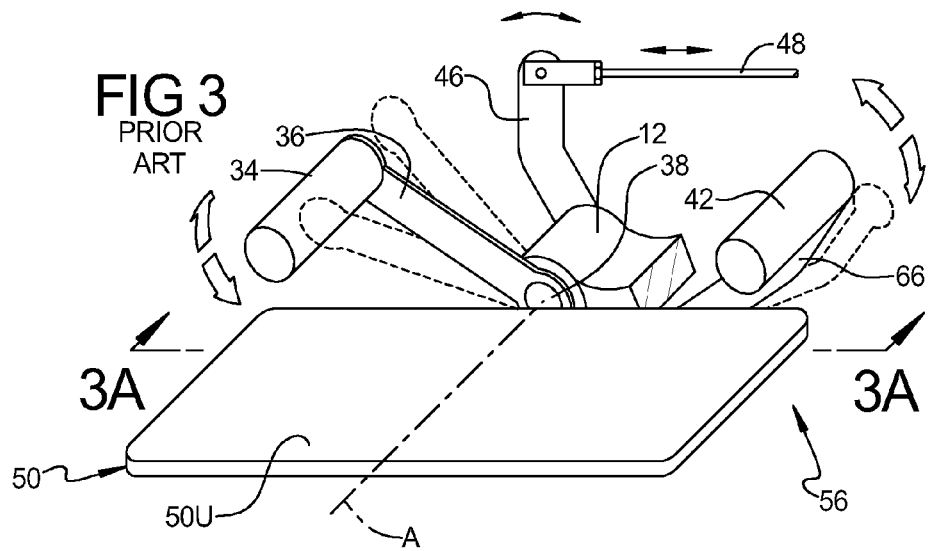

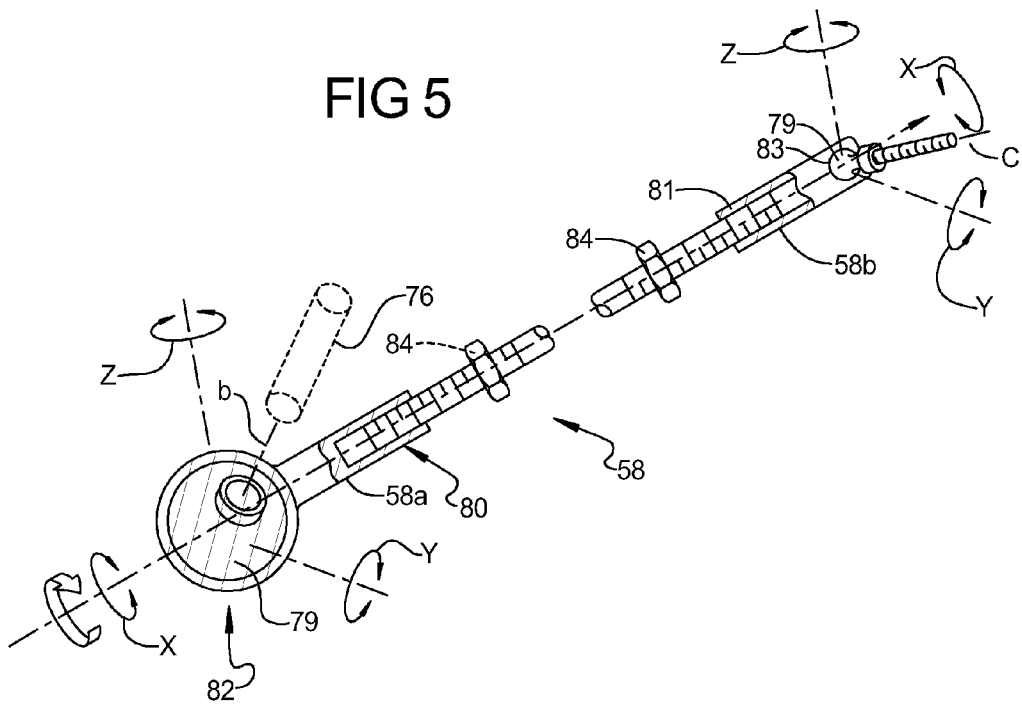
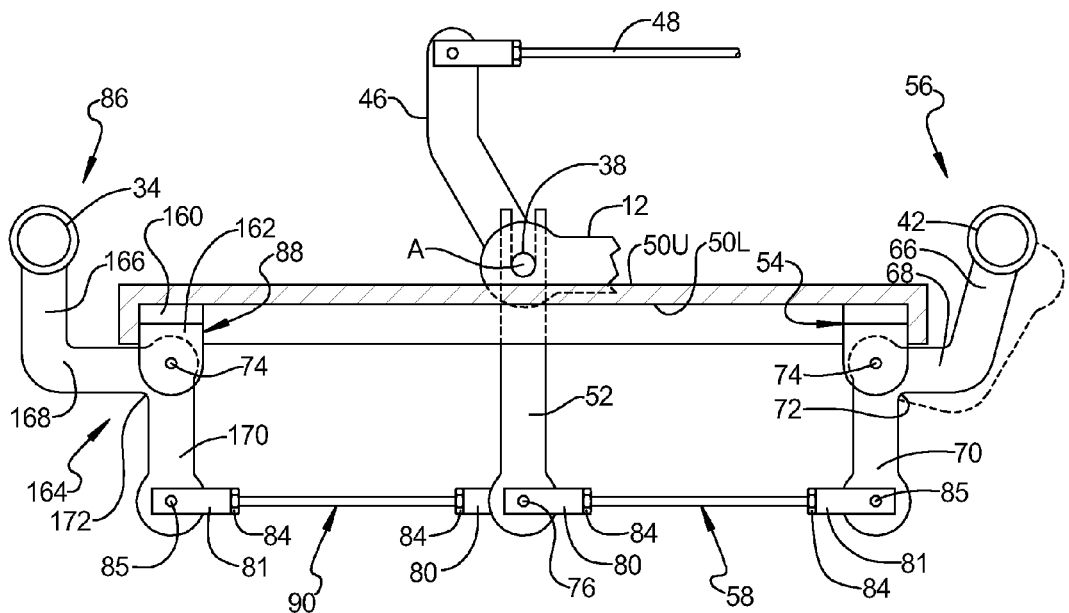

MOTORCYCLE GEAR SHIFT CONTROL

CROSS-REFERENCE TO RELATED APPLICATIONS

This application claims priority to co-pending U.S. Provisional Patent Application Ser. No. 60/560,389, filed on Apr. 8, 2004, the contents of which is incorporated herein by reference in its entirety.

FIELD OF THE INVENTION

The present invention relates to a foot operated gear shift assembly for shifting the gears of a conventional motorcycle, an all-terrain vehicle, and like vehicles. Even more particularly, the present invention concerns a gear shift conversion kit which separates the heel and toe shift elements of a conventional one-piece gear shift assembly, such as found on Harley-Davidson motorcycles.

DESCRIPTION OF RELATED ART

As is known to those skilled in the art to which the present invention pertains, motorcycles are provided with a transmission and a foot pedal mechanism that is disposed on one side, usually the left side, of the motorcycle. The foot pedal is coupled through a pivoting arrangement to a shift rod which, in turn, is connected to the transmission to move the gears up for acceleration and down for deceleration. The gears are shifted by appropriate placement of the rider's foot relative to a foot pedal(s) of the shift mechanism.

In one prior art motorcycle, the foot pedal shift mechanism includes a stationary foot rest in the form of foot peg, a foot plate or floor board upon which the sole of an operator's boot or shoe of an operator's left foot rests during travel. Further, to shift the gears of the motorcycle transmission, a gull-shaped shift lever or pedal is associated with and generally located between the opposite ends of the foot rest. The shift pedal includes a forward or first portion adapted to be engaged by the top and bottom surfaces of the toe of the riders boot and a rearward or second portion adapted to be engaged by the heel of the rider's boot.

During normal operation, the foot of the rider and the weight of the leg rest on and are supported by the stationary foot rest. The toe and heel of the rider's boot or shoe are used to accelerate or decelerate the motorcycle. With the heel resting on the foot rest, the bottom and top surfaces of the toe of the rider's shoe are placed under or atop the first or forward end portion of the shift lever wherein to rotate the first portion upwardly and/or downwardly, rotate a shift control lever arm, and axially move a shift rod to shift the gears of the motorcycle. Downward movement of the first portion of the shift lever by the toe decelerates the motorcycle and upward movement by the toe accelerates the motorcycle. Further, with the front ball of the foot resting on the foot rest, the heel is placed on the rearward or second portion, and downward movement of the heel causes the distal end portion of the shift lever to rotate downwardly and the shift rod to move axially to accelerate the motorcycle.

Some motorcycles include only the toe operated shift lever. In the operation of the gear shift system using the toe only, the rider must continually position the heel at a predetermined location on the foot rest and in a position wherein the toe rider can merely depress or lift the toe portion of his foot with a pivotal movement about his ankle joint to shift the gears of the motorcycle. In congested traffic, maintaining one's foot in a fixed position can be fatiguing and possibly lead to cramps. The alternating use of the heel does not typically provide much relief to this discomfort.

While this motorcycle foot gearshift assembly has met with substantial success since it frees the hands of the motorcycle rider from the duties of shifting gears, the toe portion of the foot must still be maneuvered laterally from above and from below the foot pedal to downshift and up-shift gears, which requires concentration for the inexperienced rider and hesitation for many riders when the toe of the foot happens to be on the wrong surface of the pedal. Also, if the rider should inadvertently shift through a gear, the rider must reposition his foot with respect to the foot pedal before he can shift back to the desired gear.

SUMMARY OF THE INVENTION

It is an object of the present invention to provide an improved gear shift control lever for a motorcycle, which control lever can be used to retrofit or otherwise be provided in kit form to convert the gear shift assembly of an originally manufactured motorcycle.

It is another object of the present invention to provide such a gear shift control lever assembly which is less fatiguing than the prior art when used frequently and during traffic congestion and the like.

It is yet another object of the present invention to provide an articulated motorcycle shift control wherein the toe and heel operated levers are axially spaced but operably connected both to one another by control linkage and to the original shift control structure of the motorcycle, the toe and heel operated levers connected to the motorcycle structure for rotation thereto and about a separate pivot axis, the pivot axes being in axially spaced relation Yet a further object of this invention is the provision of articulated heel and toe operated shift control for a motorcycle of the type including shift control linkage, a gear shift pivot shaft connected to the linkage, and a flat foot rest adjacent to the pivot shaft, comprising the heel and toe operated levers being mounted for rotation about a respective pivot axis with the heel operated lever pivot axis being adjacent the rearward end of the foot rest and the pivot axis of the toe operated lever being forwardly of the heel operated lever pivot axis, such as at the pivot shaft or adjacent the forward end of the foot rest.

Yet another object and important aspect of this invention is the provision at opposite ends of a connecting link with structure that enables the ends to be snugly pinned and swivel relative to there connection to the linkage of the toe and heel shift control, the connecting link structure including sleeves for increasing/decreasing the length of the link and ball joint sockets which are associated with the pin connections and enable the connecting link to swivel and allow axial mismatch between the end connections.

Briefly described, the objects of the present invention are achieved in a foot actuated gearshift for shifting the gears of a motorcycle transmission, comprising a stationary foot rest supported on a bottom portion of the motorcycle structure, a laterally extending pivot shaft journalled in the motorcycle structure for rotation about a first pivot axis, a gear shift lever fixedly connected to said pivot shaft for simultaneous pivoting movement therewith and coupled to the gears of said transmission, a laterally extending pivot pin adjacent to a rearward end of said foot rest, said pivot pin defining a second pivot axis that is in spaced relation to said first pivot axis, a heel pedal lever and a toe pedal lever mounted for pivoting rotational movement about separate pivot axes relative to the motorcycle structure, said heel pedal lever mounted to said pivot pin for pivoting motion relative thereto, an actuating lever fixedly connected to said pivot shaft to simultaneously rotate said gear shift lever upon pivoting rotation of said pivot shaft, and linkage structure below the foot rest for connecting the pedal levers and the actuating lever together in such manner that the gears of the transmission are shifted upon pivoting rotational movement of either of said heel pedal lever and said toe pedal lever.

In a second embodiment according to this his invention, the above objects of this invention are achieved in a foot operated gearshift lever assembly connected to the transmission of a motorcycle for shifting the transmission between a higher gear and a lower gear, the motorcycle including a stationary foot rest attached to a bottom portion of the motorcycle structure, and a pivot shaft between the opposite forward and rearward ends of said foot rest and journalled in said motorcycle structure for rotation about a pivot axis, and said gear shift lever assembly including a toe and a heel operated shift pedal operably connected to said pivot shaft wherein to rotate same, and a gear shift linkage connected to said pivot shaft for coupling the gear shift lever assembly to the transmission, the improvement wherein said gear shift lever assembly is articulated and arranged to permit alternate shifting of the motorcycle when the foot of the motorcycle operator is resting on the foot rest and comprises a mounting bracket at the rearward end portion of said foot rest, said heel operated shift pedal is pivotally mounted to said mounting bracket for rotation about a first pivot axis that is parallel and spaced from the axis of rotation of each said pivot shaft and toe operated shift pedal, and a connecting linkage operably connecting the heel operated shift pedal to said toe operated shift pedal.

According to first aspect of this second embodiment, the improvement comprises:

said toe and heel operated shift pedals each include an upper and a lower end portion, the lower end portion of said toe operated shift pedal being fixedly attached to the pivot shaft to rotate same, and the lower end portion of said heel operated shift pedal extending below the foot rest, and said connecting linkage for connecting the heel operated shift pedal to the toe operated shift pedal comprises an actuating lever arm and a connecting link, said actuating lever arm including upper and lower end portions with the upper end portion thereof being fixedly connected to the pivot shaft to rotate with same and the lower end portion thereof projecting below the foot rest, and said connecting link having forward and rearward end portions, said forward end portion being pin connected to the lower end portion of said actuating arm, and said rearward end portion being pin connected to the lower end portion of said heel operated shift pedal According to a second aspect of this second embodiment, the improvement comprises said toe and heel operated shift pedals each include an upper and a lower end portion, each said lower end portion extending below the foot rest, a second mounting bracket is disposed at the forward end portion of said foot rest, said toe operated shift pedal is pivotally mounted to said second mounting bracket for rotation about a second pivot axis that is parallel and spaced from the first axis of said heel operated shift pedal and the of axis of rotation of said pivot shaft, and said connecting linkage for operably connecting the heel operated shift pedal to the toe operated shift pedal comprises an actuating lever arm and a connecting link, said actuating lever arm including upper and lower end portions, the upper end portion of said actuating lever arm being fixedly connected to the pivot shaft to rotate with same, and the lower end portion of said actuating lever arm projecting below the foot rest, and said connecting link having forward and rearward end portions, respectively, pin connected to the lower end portions of said toe and the heel operated shift pedals, and a medial portion pin connected to the lower end portion of the actuating lever arm.

Importantly, the connecting link may comprise first and second links and may be one piece. If the connecting link is in two parts, each part is like configured to include the forward end portion of the connecting link and an opposite end portion, the forward end portions being configured to be pin connected to a respective lower end portion of said toe and said heel operated shift pedals, and the opposite end portions of said first and second links being configured to be pin connected to the lower end portion of the actuating lever arm.

The forward and opposite end portions of the first and second links are preferably provided with a sleeve and a swivel ball joint, the sleeve being axially positionable relative to the link end portion to shorten or lengthen the effective length of the link, and the swivel ball joint and a pivot pin associated therewith to swivel relative to the ball socket to adjust for axial mismatch of the link relative to the pin connections.

The ball joint at one and the other respective end of the connecting link includes a bore to receive a mounting pin therein and a mounting pin that extends therefrom to swivel thereto.

If the connecting link is one piece, the opposite ends of the connecting link define the forward and rearward ends, each end provided with an adjustable connecting sleeve, and a swivel ball joint with a mounting pin, and the medial portion is provided with a swivel ball joint with a bore therethrough to receive a pin for mounting the connecting link to the lower end portion of the actuating arm.

According to an important aspect of the above embodiments, the opposite ends of the connector links are externally threaded and threadably connected to respective connector sleeves, which enables the length of the link to be lengthened/shortened, as desired, and the pin connections at the opposite ends to be "snugged-up" during installation.

A third embodiment according to this invention is provided in a foot operated gearshift lever assembly connected to the transmission of a motorcycle for shifting the transmission between a higher gear and a lower gear, the motorcycle including a stationary foot rest attached to a bottom portion of the motorcycle structure, and an original shifting structure, said shifting structure including an original pivot shaft journalled for rotation adjacent to the foot rest, toe and heel operated gear shift pedal levers, said pedal levers coupled to said pivot shaft wherein to rotate same in a rocker arm manner, and a shift rod coupled to said transmission and said pivot shaft for coupling the shift pedal levers to the transmission, the improvement comprising a supplemental shifting structure constructed and arranged to convert the original rocker arm shifting structure and permit alternate shifting of the motorcycle when the foot of the motorcycle operator is resting on an upper surface of the foot rest, said supplemental shifting structure comprising a forward and a rearward mounting bracket, respectively, at the forward and rearward end portions of said foot rest, said toe and heel operated shift pedal levers, respectively, pivotally mounted to said forward and rearward brackets and having lower end portions disposed below the foot rest, and a connecting linkage operably connecting the shift pedal levers together and with the pivot shaft, said connecting linkage including a forward connector link having a forward end portion pivotally connected to the lower end portion of said toe operated shift pedal lever and a second end portion, a rearward connector link having a rearward end portion pivotally connected to the lower end portion of said heel operated shift pedal lever and a second end portion, and an actuating lever arm having an upper end portion fixedly connected to said pivot shaft and a lower end portion disposed below the foot rest, said lower end portion of the actuating lever arm and the second end portions of said toe and heel operated shift pedal levers being pivotally interconnected with one another.

According to an aspect of this fourth embodiment, the forward and rearward connector links are formed into one piece, with the medial portion thereof pinned to the lower end portion of the actuating link.

According to an important aspect of the above embodiments, the opposite ends of the connector links are threadably connected to respective connector sleeves, which sleeves are coupled to the respective lower ends of the toe and heel shift pedal levers and the lower end of the actuating link, rotation of the respective connector links enabling the linkage to be adjusted and snugged up during installation.

Also and according to this invention there is provided a kit for converting or modifying the original rocker-arm type gear shift structure of a straddle-type motorcycle, the original motorcycle including a power unit having a transmission assembly, a pivot shaft, linkage connecting the pivot shaft to the transmission, a stationary foot rest attached to a bottom portion of the motorcycle structure, and an original toe and a heel operated shift pedal lever fixedly mounted to said pivot shaft, the kit comprising:

first and second pivot pins, a mounting pin, a heel operated replacement shift pedal lever, said replacement shift pedal lever having an upper end portion, a lower end portion, and a medial portion, said upper end portion including a pedal extending outwardly therefrom that is engageable by the heel of the rider, said medial portion including a bore for receiving the mounting pin, and said lower end portion including an aperture for receiving the first pivot pin, a mounting bracket including a bore for receiving the mounting pin, said bracket being mountable to the rearward end portion of said foot rest and for mounting the replacement shift pedal lever for rotation about a pivot axis spaced from the pivot axis of the original toe operated shift lever pedal, an actuating lever arm, said lever arm including an upper end portion configured to fixedly clamp about the pivot shaft and a lower end portion including an aperture for receiving the second pivot pin, and a connecting link having forward and rearward end portions, each said end portion including an aperture for receiving a pivot pin, the forward end portion of the connecting link being connectible to the lower end portion of the actuating lever arm by passing said second pivot pin through the apertures formed in each, and the rearward end portion of the connecting link being connectible to the lower end portion of the heel operated shift lever by passing the first pivot pin through the apertures formed in each.

In another embodiment according to this invention, there is provided a kit for converting or modifying the original gear shift structure of a straddle-type motorcycle, the original motorcycle including a power unit having a transmission assembly, a pivot shaft, linkage connecting the pivot shaft to the transmission, a stationary foot rest attached to a bottom portion of the motorcycle structure, and an original toe and a heel operated shift pedal lever fixedly mounted to said pivot shaft, the kit comprising:

a pair of mounting pins, three pivot pins, a toe and a heel operated replacement shift pedal lever, each replacement shift lever pedal lever including an upper end portion, a lower end portion, and a medial portion, each said upper end portion including a pedal extending outwardly therefrom that is engageable, respectively, by the toe and the heel of the rider, each said medial portion including a bore for receiving a respective mounting pin, and each said lower end portion including an aperture for receiving a respective pivot pin, a first and a second mounting bracket, respectively, for mounting the toe and the heel operated replacement shift pedal lever to a respective opposite end portion of the foot rest, each said bracket including a bore for receiving a respective mounting pin and the bores defining spaced pivot axes for the replacement shift pedal levers, an actuating lever arm, said lever arm including an upper end portion configured to fixedly clamp about the pivot shaft and a lower end portion including an aperture for receiving a pivot pin, and first and second connecting links each having first and second end portions with each said end portion including an aperture for receiving a pivot pin, the first end portions of the connecting links being connectible to the lower end portion of the actuating lever arm by a pivot pin passing through the apertures formed in each, and the second end portions of the connecting links being connectible, respectively, to the lower end portion of the toe and the heel operated replacement shift pedal levers by a respective pivot pin passing through the apertures in each.

Further and according to a preferred embodiment of this invention, there is provided a connecting link for transmitting torque and force between spaced connections, comprising:

an axially elongated shaft having opposite end portions, the end portions being externally threaded, first and second connector sleeves, each connector sleeve having an internally threaded bore, one and the other sleeve being threadably connected to a respective of said opposite end portions, relative rotation between a sleeve and the shaft changing the position of the sleeve relative to the end portion of the shaft and the effective length of the shaft, a first ball joint associated with said first connector sleeve, said first ball joint including a socket and a spherical ball member adapted to rotate within said socket, said ball member including a through bore for receiving a pin member and forming a first connectible end portion, and a second ball joint associated with said second connector sleeve, said second ball joint including a socket and a spherical ball member adapted to rotate within said socket, said ball member including a pin member extending radially outwardly therefrom for mounting within a receiving bore and forming a second connectible end portion.

In an aspect of this embodiment, first and second lock nuts are threadably engaged with a respective of the threaded end portions and movable thereto wherein to move into engagement with the connector sleeve associated therewith and lock the connector sleeve is position when the connector sleeve is axially positioned where desired.

According to yet another preferred embodiment, this invention provides a method of converting a rocker-type gear shift assembly of a motorcycle transmission, the motorcycle including a pivot shaft, stationary foot rest having forward and rearward end portions, toe and heel operated pedal lever arms connected to one another and the pivot shaft and the motorcycle in a manner that back and forth rotation of one said pedal lever arm shifts the motorcycle transmission between higher and lower gears, the steps of the method comprising replacing the original toe and heel operated pedal lever arms with a replacement toe and a heel operated pedal lever arm, each replacement pedal lever arm including an upper portion provided with a pedal, a medial portion provided with a bore for receiving a mounting pin, and a lower portion provided with an aperture for receiving a pivot pin, attaching a mounting bracket, respectively, to a forward and rearward end portion of said foot rest, each said mounting bracket for mounting a respective of said replacement pedal levers and each provided with a bore for receiving a mounting pin, pivotably connecting the medial portions of said replacement pedal lever arms, respectively, to one and the other of said mounting brackets, said connecting including aligning the bores in respective of the replacement pedal lever arm and mounting brackets and passing a respective mounting pin through each respective pair of aligned bores, said connecting mounting the replacement pedal levers arms for pivoting movement about axes that are spaced from one another, fixedly connecting an actuating lever to the pivot shaft, said actuating lever including a lower end portion provided with an aperture for receiving a pivot pin and said connecting disposing said lower end portion below said foot rest, pivotably connecting the lower end portions of the toe operated replacement shift lever pedal, the heel operated replacement pedal lever, and the actuating lever to one another, said connecting including providing a respective pivot pin in the apertures of the pedal levers and the actuating lever.

Various other objects, features and advantages of the invention will be made apparent from the following description taken together with the drawings.

BRIEF DESCRIPTION OF THE DRAWINGS

FIG. 3 is an enlarged perspective view, similar to FIG. 2, showing a preferred embodiment of a toe and heel gear shift structure for converting the original gear shift mechanism of a conventional motorcycle, according to the present invention, retrofitted onto the motorcycle illustrated in FIG. 1.

FIG. 4 is a partial elevation view, and partially in section, of the toe and heel gear shift structure shown in FIG. 3 retrofitted onto the motorcycle of FIG. 1, the mounting as seen looking at the left side of the motorcycle.

FIG. 5 shows a connecting link according to this invention, including an externally threaded shaft, a connector sleeve that is threadably mounted to each end of the shaft and axially movable to lengthen or shorten the length of the connecting link, and a ball joint swivel socket provided to each sleeve, which provides a pin connection that swivels to enable the link to deflect relative to the pin connection.

FIG. 6 is a partial side elevation view, and partially in section, of another preferred embodiment of a toe and heel gear shift structure for converting the original gear shift mechanism of a conventional motorcycle, according to this invention, retrofitted onto the motorcycle of FIG. 1.

DESCRIPTION OF PREFERRED EMBODIMENTS

Figure 1:
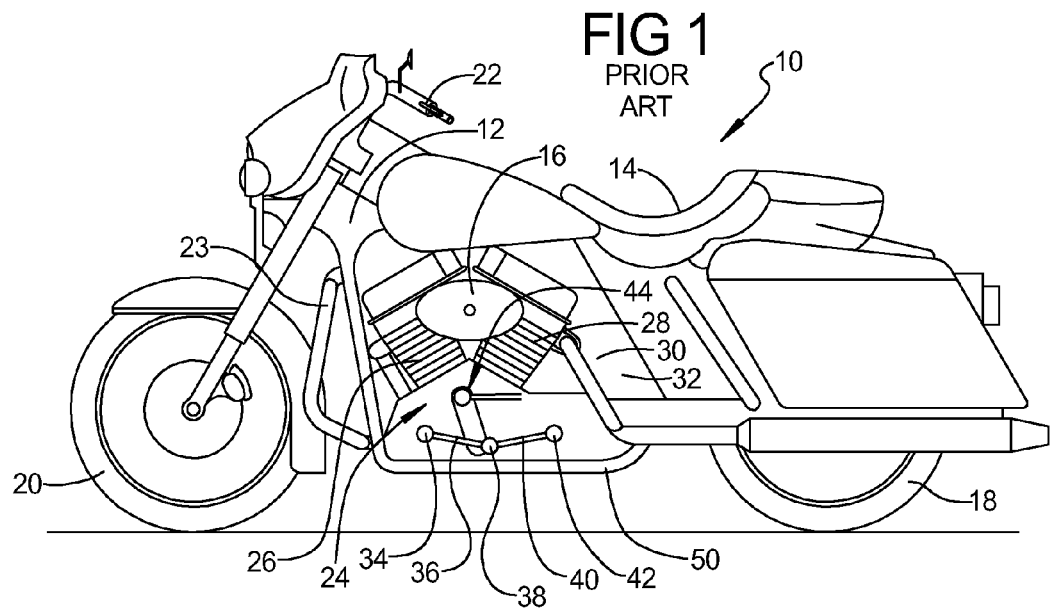
FIG. 1 is an elevation view of the left side of a prior art motorcycle equipped with a conventional gull-shaped, rocker arm type toe and heel shift control mechanism.
Figure 2:
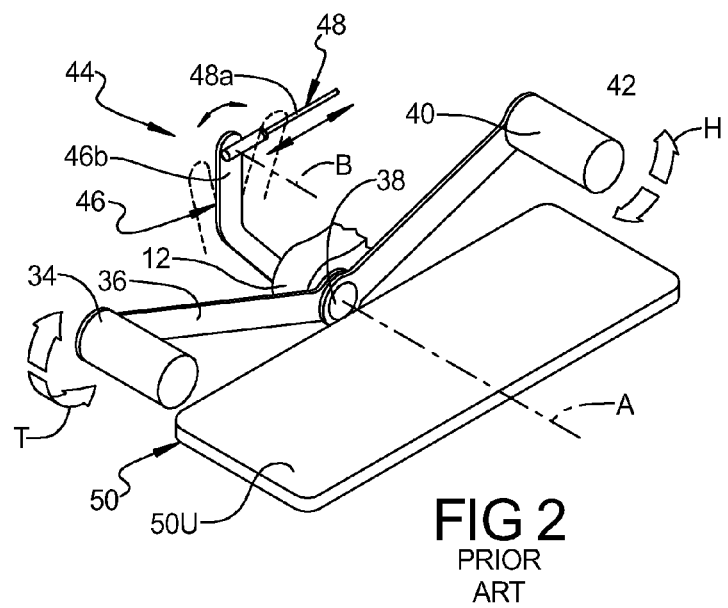
FIG. 2 is an enlarged perspective view of a portion of the rocker arm toe and heel gear shift control mechanism shown in FIG. 1.

Now, and with reference to the drawings, and turning to FIGS. 1 and 2, there is depicted therein a conventional motorcycle 10, including a frame 12 adapted to be straddled by a rider, a seat area 14 for accommodating the rider, a fuel tank 16, a non-steerable rear wheel 18, and a front wheel 20 steerable by means of a handlebar 22. As shown, a protective and/or reinforcing supporting structure in the form of a crash or roll bar 23 is attached to the forward portion of the frame 12.

Mounted to the frame 12 below the seat is a conventional internal combustion engine 24, comprising at least two cylinders 26 and 28, at the bottom of which is a belt drive housing 30.

A conventional transmission 32 of multiple gears is associated with the belt drive housing 30 to transmit power to the rear wheel 18 and cause movement of the motorcycle 10. The transmission gearing is controlled through a clutch (not shown) located on the handlebar 22 and a rocker arm type of gear shift operated by the foot of the motorcycle rider. Shifting may occur through downward or upward foot pressure by the toe of the rider being placed on a conventional shift pedal 34 attached at the distal end of an offset lever 36, or downward pressure being placed by the riders heel on a conventional shift pedal 42 attached at the distal end of an offset lever 40.

As is well known, the levers 36 and 40 have respective ends fixedly clamped or otherwise secured to a pivot shaft 38 journalled for rotation in and projecting laterally of the motorcycle frame, whereby to rotate the shaft relative to an axis "A" through the shaft. The pivot shaft 38 is connected by appropriate linkage 44 to the transmission to ratchet the gears upward for acceleration and downward for deceleration. Upward and downward angular pivoting movement of the toe and heel pedals 34 and 42, respectively, relative to the pivot axis "A", is caused by toe and heel forces and is shown by the curved arrows, labeled at "T" (for toe forces) and "H" (for heel forces).

The linkage 44 includes a link or lever arm 46 and an elongated shift rod 48. The lever arm 46 has a lower end portion fixedly secured to the pivot shaft 38 (not shown) to rotate the pivot shaft 38 about the axis "A" and an upper end portion 46b pivotally connected to the forward end portion 48a of the shift rod 48 for relative rotation about the axis "B" disposed in parallel spaced relation to the axis "A". The other end of the shift rod 48 is operatively coupled (not shown) to the transmission. Rotation of the rocker arms 36 and 40 transmit torque via the pivot shaft 38 to the lever arm 46, and then to the shift rod 48. In FIG. 2, the lever arm positions when moved forward and rearward are shown in phantom.

The motorcycle 10 includes a footrest 50 on each side of the motorcycle and each comprises an elongated generally rectangular shaped frame atop which is secured a floor board or foot plate having upper and lower surfaces 50U and 50L. The foot rests are attached to the frame 12 in a manner that each extends laterally outwardly from the bottom structure of the motorcycle. The foot rest on the right side (not shown) is typically used in conjunction with braking structure (not shown) of the motorcycle. The foot rest on the left side is used in conjunction with gear shifting.

With this type of conventional shifting mechanism, to up-shift, the motorcycle operator or rider engages the toe of his foot under the shift pedal 34 and uses the toe to rotate and move the shift pedal 34 upwardly; and then, to downshift, the operator must then reposition the foot so that the toe is on top of the shift pedal 34 and uses the toe to press the shift pedal downwardly. Because repeated up and down movement of the toe is awkward and may cause discomfort, to up-shift, the operator may place his heel on the rear heel shift pedal 42 and use the heel to force the pedal 42 to rotate downwardly.

Further, the above arrangement wherein the shifting levers 36 and 40 form a rigid gull-shaped rocker arm mechanism that rotates the pivot shaft 38 about a common pivot point (located on the axis "A") at a location atop the foot rest 50 makes difficult the manipulation of the foot relative to the shift pedals 34 and 42 and movement of the foot into resting relation upon the upper surface 50U of the foot rest 50.

According to this invention, preferred embodiments of apparatus are disclosed for converting the conventional shift structure of the motorcycle 10, shown and described herein above. The elements of the apparatus may be assembled into a kit form and used to convert the gear shift structure of the conventional motorcycle 10, as shown in FIGS. 1 and 2, or the gear structure of other conventional motorcycles.

Figure 3A:
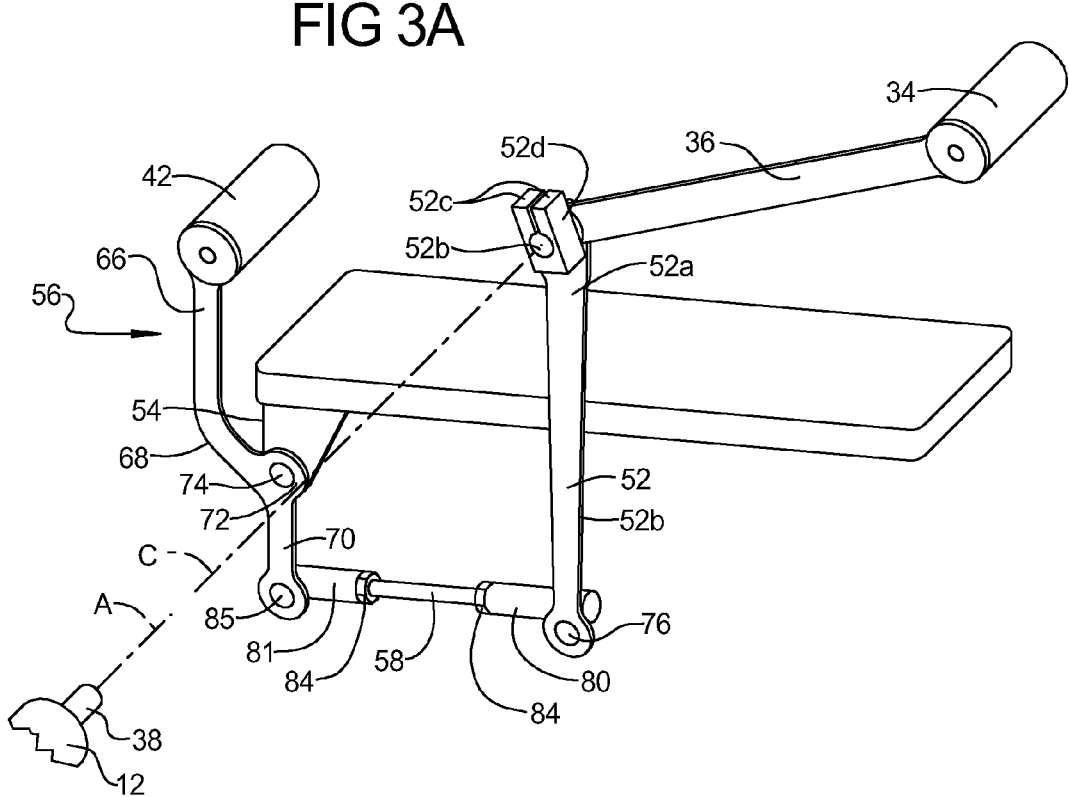
FIG. 3A is a perspective view of the toe and heel gear shift structure mounted to the footrest of the motorcycle frame as seen along line 3A-3A of FIG. 3, the mounting and foot rest being shown spaced from the motorcycle frame and the view looking at the inward facing side of the mounting and foot rest.
Figure 6A:
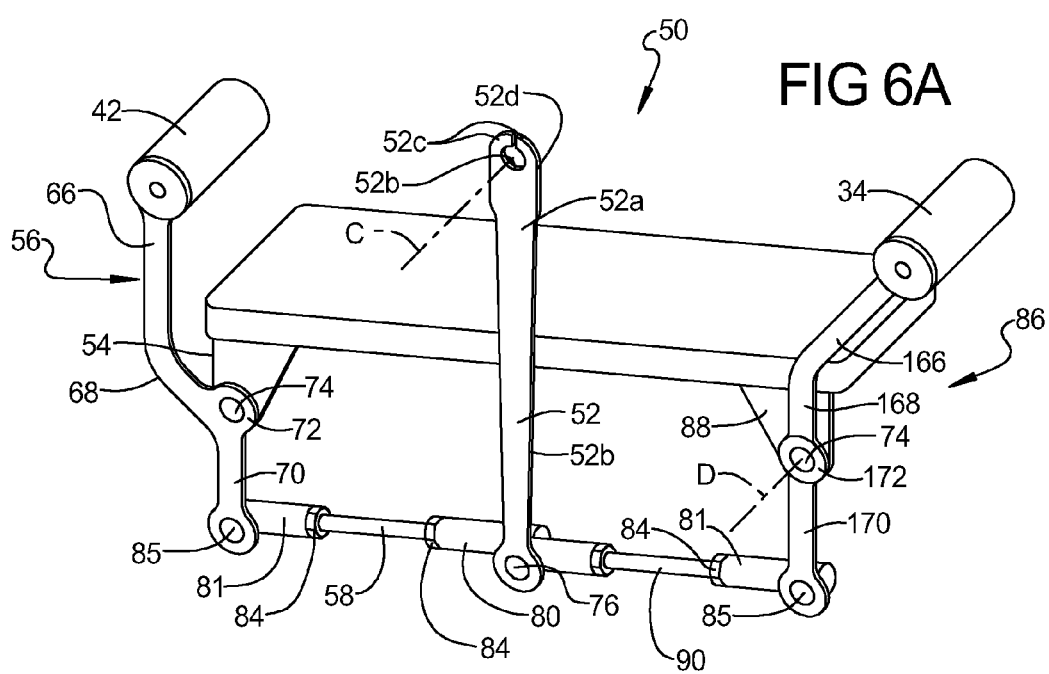
FIG. 6A is a perspective view of the toe and heel gear shift structure mounted to the footrest of the motorcycle frame, the mounting and footrest being shown spaced from the motorcycle frame and the view looking at the inward facing side of the mounting and foot rest.

In particular, improved gear shift structure is disclosed in a first embodiment, identified as 10A and shown in FIGS. 3, 3A, and 4, and a second embodiment, identified as 10B and shown in FIGS. 6 and 6A. In each of these embodiments, the heel and toe operated rocker arm type gear shift structure of the motorcycle 10 is modified, wherein to separate the toe operated pedal relative to the heel operated pedal, and wherein to provide conversion parts that are adapted to be distributed to the user in the form of a kit. Although shown and described in the nature of a kit for converting or retrofitting a user's motorcycle, the gear shift structure shown and described herein may be supplied with a motorcycle as original equipment.

Turning to FIGS. 3, 3A, and 4, the gear shifting structure 10A according to this invention is constructed and arranged to permit alternate shifting of the motorcycle 10 when the foot of the motorcycle operator is resting on the upper surface 50U of the foot rest 50. The shifting structure 10A comprises the toe operated shift lever 36, an actuating lever arm 52, a mounting bracket 54 (shown best in FIGS. 3A and 4) disposed at the rearward end of the foot rest 50, a heel operated shift lever 56 pivotably connected to the mounting bracket 54, and a connecting link 58 operably connecting the actuating lever arm 52 to the heel shift lever 52, thereby placing the toe and heel levers 36 and 56 in operable relation with one another. The shift lever arm 36 and actuating lever arm 52 have respective ends fixedly connected to the pivot shaft 38, which shaft is journalled in the motorcycle structure 12, to rotate the shaft 38 about the pivot axis "A".

The mounting bracket 54 is generally L-shaped and includes a foot or mounting base 60, fixedly mounted to the underside (or bottom surface) 50L of the foot rest 50, and a flange 62, projecting downwardly and away from the bottom surface 50L. The bracket 54 is attached to the original foot rest 50, such as by conventional fasteners (not shown) threadably engaged with bores drilled into the bottom surface 50L of the plate of the foot rest.

The heel operated shift lever 56 includes upper and lower lever arms, including an L-shaped upper lever arm 64 having an arm 66 and a leg 68, a lower lever arm 70, and a medial portion 72. The arm 66 of the upper lever arm 64 projects upwardly and above the plane of the upper surface 50U of the foot rest 50 and the lower lever arm 70 projects downwardly and below the lower surface 50L of the foot rest 50.

The medial portion 72 connects the upper end of the lower lever arm 70 to the distal end of the leg 68 of the upper lever arm 64. Further, the medial portion 70 of the heel operated shift lever 56 is connected to the flange 62 of the mounting bracket 54 by a pin, shaft or like connector 74 wherein to enable the heel operated shift lever to rotate freely relative to the connection and about an axis "C" that is generally parallel to and spaced from the axis "A" of the pivot shaft 38.

A peg or shift pedal member, such as shown at 42, extends laterally outwardly from the upper distal end of the arm 66 of the upper lever arm 64, the shift pedal member being sized to receive the heel of the operator's shoe or boot.

A toe operated shift lever assembly comprises the shift lever 36 and the actuating lever arm 52, whereby to form an L-shaped toe operated lever assembly. The actuating lever arm 52 includes upper and lower end portions 52a and 52b. The shift lever arm 36 and the actuating lever arm 52 have, respectively, upper and lower end portions 36a and 52a, each including a through bore sized to conform and fixedly clamp about a lateral outward end portion of the original pivot shaft 38 whereby to rotate the shaft 38 about the axis "A". The lower and upper end portions 36a and 52a are, respectively, fixedly clamped and connected to one another and the pivot shaft in a manner that relative movement between the toe operated shift lever 36 and the actuating lever arm 52 from the L-shape is inhibited.

The upper end portion 52a of the actuating lever arm 52 is split to form a pair of cantilever beams 52c, which are configured to form the through bore 52b. A fastener 52d forces the beams 52c towards one another whereby the walls of the through bore 52b are driven into clamped engagement about the pivot shaft 38. Rotation of the pivot shaft 38 operates to rotate the link arm 46 connected to the shift rod 48

A peg or shift pedal member, such as shown at 34, extends laterally outwardly from the upper distal end of the toe operated shift lever 36, the shift pedal member 34 being adapted to be engaged by the toe of the operator's shoe or boot.

The connecting link 58 is axially elongated and has forward and rearward end portions 58a and 58b, respectively, pivotably connected to the lower end portion 52b of the actuating lever arm 52 and the lower end portion of the lever arm 70. The forward end portion 58a is connected by a pin 76 to the lower end portion of the actuating lever arm 52. The rearward end portion 58b is connected by a pin 75 to the lower end portion of the lever arm 70 of the heel operated shift lever 56.

So connected, the connecting link 58 is in generally parallel spaced relation below the lower surface 50L of the foot rest 50. A parallelogram linkage, which swings below the foot rest 50, is thus defined.

Turning to FIG. 5, to provide a snug, but non-binding fitment between the toe and heel operated levers 36 and 56, the opposite forward and rearward end portions 58a and 58b of the connecting link 58, respectively, are provided with an adjustable connecting sleeve and a swivel socket. As illustrated in FIG. 5, the forward end portion 58a is provided with a connecting sleeve 80 and a swivel socket 82 and the rearward end portion 58b is provided with a connecting sleeve 81 and a swivel socket 83.

The connecting sleeves 80 and 81 are similar and each includes an internally threaded bore that is threadably engaged with external thread formed on the end portion of the link 58. Rotation of the link 58 relative to the connecting sleeve causes relative axial movement therebetween. Depending on the sense of the thread, such relative rotation causes the connecting sleeve to move axially relative to the link and the "effective" length of the connecting link 58 to lengthen or shorten.

A threaded jam nut 84 may be carried on each threaded end portion 58a and 58b. The jam nut may be rotated and moved into abutment with the associated connecting sleeve 80 or 81 wherein to hold the connecting sleeve in fixed angular and axial position relative to the connecting link 58.

The swivel sockets 82 and 83 are similar in that each comprises a ball joint wherein a spherical ball member is disposed in a socket and the ball member is able to swivel in the socket 360° relative to each of the coordinate axes x, y, and z. The coordinate axes x, y, and z are centered on the geometrical axis through the center of the link. Each ball member is associated with a connection pin and rotation of the ball member permits the reorientation of the connection pin relative to the connecting sleeve associated therewith upon application of force to the connection.

The swivel socket 82 is formed in the connecting sleeve 80. The ball member 79 includes a bore 77 therethrough and disposed along an axis "b" for receiving a pivot pin 76. As noted, the pin 76 connects the actuating lever arm 52 to the connecting link 58.

The swivel socket 83 is formed in the connecting sleeve 81 and includes the ball member 79 and a threaded pivot pin 85 extending radially outwardly from the ball member and disposed along an axis "c". The pivot pin 85 is adapted to pivotably connect the end portion 58b of the link 58 to the lower end portion of the lever arm 70 and the angular orientation thereof relative to the connecting sleeve 81 to change upon application of force to the connection. While not shown, a nut would be provided at the end of the pin 85.

The actuating lever arm 52, the connecting link 58, and the lever arm 70, with the connecting pins 74, 76 and 85 and pivot shaft 38, form a parallelogram linkage that swings forwardly and rearwardly below the lower surface 50L of the foot rest 50. Operation of the toe operated shift lever 36 by the toe of the rider on the pedal 34, transmits torque and movement to the actuating lever arm 52, causing the pivot shaft 38 to rotate. This rotation transmits torque to the lever arm 46 and shift rod 48, and a shift in the gear. This rotation also transmits torque to the connecting link 58 and to the lever 70 of the heel operated lever 56, causing the pedal 42 of the heel operated shift lever 56 to rotate upwardly or downwardly, depending on the direction of movement of the peg 34 of the toe operated shift lever 36, and vice versa. Gear shift in the opposite direction may be accomplished by heel actuation of the pedal 42.

Such shifting movement enables the rider to support the operating foot atop the foot rest 50 when use thereof is not needed to upshift or downshift the transmission gears and change the speed of the motorcycle.

According to an important aspect of this invention there is provided a kit for converting or modifying the original shift structure of a motorcycle 10, as described herein above. The conversion kit replaces the conventional rocker arm toe and heel gear shift arrangement.

FIG. 3A, looking outwardly from the motorcycle frame 12, indicates the gear shift 10A, relative to the foot rest 50, and shows most of the essential parts that form the conversion kit for the motorcycle 10. The conversion kit includes the toe and heel operated shift levers 36 and 56, the connecting link 58 configured with the connecting sleeves and swivel joints, the mounting bracket 54, and the pivot pins 74, 76, and 85 (provided on the connecting link 58). The kit also includes the threaded fasteners, jam nuts and/or bolts to interconnect the elements into the operable assembly 10A.

The kit also includes washers as needed to inhibit unnecessary wear and tear on the pivot connections resulting from relative rotation between various of the links and levers.

A spacer (not shown) may be used in some applications to ensure that the pedal 34 of the toe operated lever 36 is outwardly of the motorcycle frame and the two pedals 34 and 42 are aligned with one another and relative to the heel operated lever arm 56. In this regard, the spacer is placed on the outward extension of the pivot shaft 38

Operation of the motorcycle gear shift system 10A is indicated in the drawings, such as by various arrows, axis identification, and by the certain structure being depicted in phantom, indicating various the neutral or rest position of various components, and their position following action of the toe or heel of the rider. An arrow "X" shows axial back and forth movement of the shift rod 48, resulting from rotation of the toe shift lever 36 and lever arm 46, such as by direct rotation of the toe pedal or force transmitted thereto by the link 58 or lever arm 70 following action of the heel operated lever 56. The curved arrows "T" (for toe) and "H" (for heel) show rotation of the toe and heel pedals 34 and 42 relative to the axis of rotation "A" of the pivot shaft 38. In general, the axes of the pivot shaft 38 and pivot pins 74, 76, and 85 are in parallel, spaced apart relation to one another.

Turning to FIGS. 6 and 6A, another preferred embodiment of a gear shift structure for converting the toe and heel gear shift structure of the motorcycle 10 is shown, and generally indicated by the number 10B. The gear shift structure 10B is used in connection with the motorcycle 10, and comprises the heel operated shift lever 56 and associated mounting bracket 54, a toe operated shift lever 86 and associated mounting bracket 88, the actuating lever arm 52, the connecting link 58, and a connecting link 90.

The heel operated shift lever 56, the mounting bracket 54, the actuating lever arm 52, and the connecting link 58 are mounted to the foot rest 50 as described herein above.

The toe operated shift lever 86 and the mounting bracket 88 are mounted to the forward end of the foot rest 50 and are similar in shape, respectively, to the heel shift lever 56 and mounting bracket 54. The mounting bracket 88 is L-shaped and includes a base 160 and a flange 162. The base 160 is fixedly connected to the bottom surface 50L of the foot rest 50 at a forward end of the foot rest and the flange 162 projects downwardly from the foot rest.

The toe operated shift lever 86 is a mirror image of the heel operated shift lever 56 and includes upper and lower lever arms, including an L-shaped upper lever arm 164 having an arm 166 and a leg 168, a lower lever arm 170, and a medial portion 172. The arm 166 of the upper lever arm 164 projects upwardly and above the plane of the upper surface 50U of the foot rest 50 and the lower lever arm 170 projects downwardly and below the lower surface 50L of the foot rest 50. The medial portion 172 connects the upper end of the lower lever arm 170 to the distal end of the leg 168 of the upper lever arm 164.

Further, the medial portion 170 of the toe operated shift lever 86 is connected to the flange 162 of the mounting bracket 88 by a pin, shaft or like connector 74 wherein to enable the toe operated shift lever 86 to rotate relative to the connection with the foot rest and about an axis "D" that is generally parallel to and spaced from the axes "A" and "C" of the pivot shaft 38 and the heel operated shift lever 56.

A peg or shift pedal member, such as shown at 34, extends laterally outwardly from the upper distal end of the arm 166 of the upper lever arm 164, the shift pedal member being sized to receive the toe of the operator's shoe or boot.

The connecting link 90 is similar to the link 58, and is axially elongated with opposite ends thereof connected, respectively, by a pin 76 to the lower end 52b of the actuating lever arm 52 and by another pin 85 to the lower end portion of the lower lever arm 170 of the toe operated shift lever 82.

The links 58 and 90, which may be of the same or different length, are adapted to interconnect the actuating lever arm 52 with the toe and the heel operated shift levers 86 and 56. So connected, the connecting links 58 and 90 are in generally parallel spaced relation below the lower surface 50L of the foot rest 50.

In a manner similar to that described herein above, the opposite end portions of the link 90 are provided with extender connecting sleeves 80 and 81 and swivel socket 82 and 83. The connecting link 90, so configured, cooperates with the connecting link 58 to ensure "snug" fitment between the toe and heel operated shift lever arms 70 and 170, the actuating lever 52, and the connecting linkage 46 and 48 of the motorcycle 10.

While shown as separate, the two connecting links 58 and 90 may comprise a single link, wherein the mid-point thereof is connected by a pin 76 to the lower end portion 52b of the actuating lever 52. The opposite ends of the single link would include the above noted connecting sleeves 80 and 81, swivel sockets 82 and 83, and connecting pin 85. The two connecting pins 85 would be connected, respectively, to the lower end portions of the lever arms 70 and 170.

The two connecting links 58 and 90, or if combined into a single rod, and the lower lever arms 70 and 170, when interconnected together with one another by the associated pins, enable rotating movement, and cooperate to form a parallelogram structure that rotates as a rigid body below the bottom surface 50L of the foot rest 50.

In operation, referring to FIG. 6, when the toe of the rider's boot or shoe is pressed downwardly against the pedal 34 of the toe operated shift lever 86, in the direction of the curved arrow "T", rotational torque is transmitted through the lever arms 166, 168, and 170, to the connecting link 90, causing the link 58 to be pushed to the right and the actuating lever arm 52 to rotate counterclockwise relative to the fixed connection with the pivot shaft 38. Rotation of the actuating lever arm 52 rotates the pivot shaft 38 and the lever 46 fixedly attached thereto to pull the shift rod 48 to the left and in the direction labeled as "T". The phantom lines indicate the rotated position of the toe operated shift lever 86 and pedal 34.

Conversely, when the heel of the rider's boot or shoe is pressed downwardly against the pedal 42 of the heel operated shift lever 56, in the direction of the curved arrow "H", rotational torque is transmitted through the lever arms 66, 68, and 70, to the link 58, causing the link 90 to be pushed to the left and the actuating lever arm 52 to rotate clockwise relative to the pin connection with the pivot shaft 38. This rotation of the actuating lever arm 52 pushes the shift rod 48 to the right and in the direction labeled as "H". The phantom lines indicate the rotated position of the heel operated shift lever 56 and pedal 42 thereon.

It shall be noted, although not shown in the drawing, that the lever arm 52 may be rotated 180° such that it is disposed above the floor board and above pivot 38, allowing the linkage to be on the top side of the floor board or foot rest and thereby relocating pivots 85 on the upper portion of the arms 66 and 166, respectively.

In a manner similar to that described herein above, a kit for converting or modifying the original shift structure of the motorcycle 10 would include the elements or items as above described for the embodiment 10A and the additional items described for the embodiment 10B. FIG. 3A, looking outwardly from the motorcycle frame 12, indicates the gear shift 10A, relative to the foot rest 50, and most of the essential parts that form the kit for converting the rocker arm gear system of the motorcycle into the gear system embodiment 10B.

The conversion kit comprises the following items: the mounting brackets 54 and 88; the control linkage elements, including the two connecting links 58 and 90, and the actuating lever arm 52; the toe and the heel operated shift levers 56 and 86, including the extender connection sleeves 80 and 81, the swivels 82 and 83 and the connecting pin 85, if desired, various washers and threaded bolts and nuts for connecting the elements together in the manner shown and described, and the pedals 34 and 42.

What is claimed is:

1. A foot actuated gearshift for shifting the gears of a motorcycle transmission comprising:

a stationary foot rest supported on a bottom portion of a motorcycle structure;

a laterally extending pivot shaft journalled in the motorcycle structure for rotation about a first pivot axis;

a gear shift lever fixedly connected to said pivot shaft for simultaneous pivoting movement therewith and coupled to the gears of said transmission;

a laterally extending pivot pin adjacent to a rearward end of said foot rest, said pivot pin defining a second pivot axis that is in spaced relation to said first pivot axis;

a heel pedal lever and a toe pedal lever, each of the levers mounted for pivoting rotational movement about separate pivot axes relative to the motorcycle structure, said heel pedal lever mounted to said pivot pin for pivoting motion relative thereto;

an actuating lever fixedly connected to said pivot shaft to simultaneously rotate said gear shift lever upon pivoting rotation of said pivot shaft; and a linkage structure below the foot rest, the linkage structure connecting the heel and toe pedal levers and the actuating lever together in such manner that the gears of the transmission are shifted upon pivoting rotational movement of either of said heel pedal lever and said toe pedal lever.

2. In a foot operated gearshift lever assembly connected to a transmission of a motorcycle for shifting the transmission between a higher gear and a lower gear, the motorcycle including a stationary foot rest attached to a bottom portion of the motorcycle, the stationary foot rest having opposed forward and rearward ends, and a pivot shaft positioned between the forward and rearward ends and journalled in said motorcycle for rotation about a first pivot axis, and said gear shift lever assembly including a toe operated shift pedal and a heel operated shift pedal, the toe and heel operated shift pedals operably connected to said pivot shaft wherein to rotate same, and a gear shift linkage connected to said pivot shaft for coupling the gear shift lever assembly to the transmission, the improvement wherein said gear shift lever assembly is articulated and arranged to permit alternate shifting of the transmission between the higher gear and the lower gear, said gear shift lever assembly comprising:

a mounting bracket at the rearward end of said foot rest, said heel operated shift pedal pivotally mounted to said mounting bracket for rotation about a second pivot axis, and a connecting linkage operably connecting the heel operated shift pedal to the toe operated shift pedal.

3. The foot operated gearshift lever assembly of claim 2, wherein:

said toe and heel operated shift pedals each include an upper and a lower end portion, the lower end portion of said toe operated shift pedal fixedly attached to the pivot shaft to rotate same, and the lower end portion of said heel operated shift pedal extending below the foot rest, and said connecting linkage for connecting the heel operated shift pedal to the toe operated shift pedal comprises an actuating lever arm and a connecting link, said actuating lever arm including an upper end portion and a lower end portion, the upper end portion thereof being fixedly connected to the pivot shaft to rotate with same and the lower end portion thereof projecting below the foot rest, and said connecting link having a forward end portion and a rearward end portion, said forward end portion being pin connected to the lower end portion of said actuating arm, and said rearward end portion being pin connected to the lower end portion of said heel operated shift pedal.

4. The foot operated gearshift lever assembly of claim 2, wherein:

said toe and heel operated shift pedals each include an upper and a lower end portion, each said lower end portion extending below the foot rest, a second mounting bracket disposed at the forward end portion of said foot rest, said toe operated shift pedal pivotally mounted to said second mounting bracket for rotation about a third pivot axis that is parallel and spaced from the first and second pivot, and said connecting linkage for operably connecting the heel operated shift pedal to the toe operated shift pedal comprises an actuating lever arm and a connecting link, said actuating lever arm including an upper end portion and a lower end portion, the upper end portion of said actuating lever arm being fixedly connected to the pivot shaft to rotate with same, and the lower end portion of said actuating lever arm projecting below the foot rest, and said connecting link having a forward end portion, a rearward end portion, and a medial portion, the forward end portion pin connected to the lower end portion of said toe operated shift pedal, the rearward end portion rotatably connected to the lower end portion of the heel operated shift pedal, and the medial portion pin connected to the lower end portion of the actuating lever arm.

5. The foot operated gearshift lever assembly of claim 4, wherein the connecting link comprises a first link and a second link, each link configured to include the forward end portion of said connecting link and an opposite end portion, the forward end portions thereof being configured to be pin connected to a respective lower end portion of said toe and said heel operated shift pedals, and the opposite end portions of said first and second links being configured to be pin connected to the lower end portion of the actuating lever arm.

6. The foot operated gearshift lever assembly of claim 5, wherein the forward and opposite end portions of the first and second links are provided with a sleeve and a swivel ball joint, the sleeve being axially positionable relative to the link end portion to shorten or lengthen the effective length of the link, and the swivel ball joint and a pivot pin associated therewith being adapted to swivel relative to the ball socket to adjust for axial mismatch of the link relative to the pin connections.

7. The foot operated gearshift lever assembly of claim 4, wherein the connecting link is one piece.

8. In a foot operated gearshift lever assembly connected to a transmission of a motorcycle for shifting the transmission between a higher gear and a lower gear, the motorcycle including a stationary foot rest attached to a bottom portion of the motorcycle, and a shifting structure, said shifting structure including a pivot shaft journalled for rotation adjacent to the foot rest, a toe operated gear shift pedal lever and a heel operated gearshift pedal lever, and a shift rod coupled to said transmission and said pivot shaft for coupling the shift pedal levers to the transmission, the improvement comprising wherein the shifting structure comprises a forward and a rearward mounting bracket, respectively, at the forward and rearward end portions of said foot rest, said toe and heel operated shift pedal levers, respectively, pivotally mounted to said forward and rearward brackets and having lower end portions disposed below the foot rest, and a connecting linkage operably connecting the toe and heel shift pedal levers together with the pivot shaft, said connecting linkage including a forward connector link having a forward end portion pivotally connected to a lower end portion of said toe operated shift pedal lever and a second end portion, a rearward connector link having a rearward end portion pivotally connected to the lower end portion of said heel operated shift pedal lever and a second end portion, and an actuating lever arm having an upper end portion fixedly connected to said pivot shaft and a lower end portion disposed below the foot rest, the second end portions of the connector links and the lower end portion of said actuating lever arm being pivotably interconnected with one another.

9. The improvement of claim 8, wherein the forward and the rearward connector links are formed into one piece and form a medial portion thereof pinned to the lower end portion of the actuating lever arm.

10. The improvement of claim 8, wherein the opposite end portions of the forward and the rearward connector links are threadably connected to respective connector sleeves, the connector sleeves pivotably coupled to the respective lower ends of the toe and the heel shift pedal levers and the lower end of the actuating link, relative rotation between the respective connector sleeve and the connector link enabling the linkage to be adjusted for proper use during installation.

11. A motorcycle adapted to be straddled by a rider, comprising:
a frame, the frame mounting a front wheel for steering, a rear wheel for powering, and a stationary foot rest for supporting a foot of the rider, the foot rest projecting outwardly and away from a bottom portion of the frame;
a power motor mounted to the frame for delivering power to the motorcycle;
a change speed transmission operatively coupled to the motor and the rear wheel, the transmission including a pivot shaft journalled for rotation relative to the frame and about a first pivot axis, gears that may be shifted as desired to increase or decrease the speed of the motorcycle, and shifting structure connecting the pivot shaft to the gears, the pivot shaft extending outwardly from the frame proximate to the foot rest; and
a foot shifter assembly operatively coupled to the transmission to shift the gears, wherein said foot shifter assembly comprises a toe and a heel pedal assembly, each said pedal assembly having an upper and a lower end portions, a medial portion, and a pedal extending away from the upper end portion for engagement, respectively, by the toe and heel of the rider, the toe pedal assembly being fixedly secured at the medial portion thereof to said pivot shaft to rotate said shaft and to rotate about said first pivot axis, a connecting link having a first and a second end portions, respectively, pivotably connected to the lower end portions of said toe and heel pedal assembly, and means for pivotably connecting the medial portion of said heel pedal assembly to said foot rest and for rotation about a second pivot axis, the pivot axes being generally parallel and in spaced relation to one another, and the connection between the pedal assemblies, the pivot shaft, the foot rest, and the connecting link forming a parallelogram linkage that is free to swing below the foot rest following force applied to one or the other pedal by the toe or heel.

12. A motorcycle adapted to be straddled by a rider, comprising:
a frame, the frame mounting a front wheel for steering, a rear wheel for powering, and a stationary foot rest for supporting a foot of the rider, the foot rest projecting outwardly and away from a bottom portion of the frame;
a power motor mounted to the frame for delivering power to the motorcycle;
a change speed transmission operatively coupled to the motor and the rear wheel, the transmission including a pivot shaft journalled for rotation relative to the frame and about a shaft pivot axis, gears that may be shifted as desired to increase or decrease the speed of the motorcycle, and shifting structure connecting the pivot shaft to the gears, the pivot shaft extending outwardly from the frame proximate to the foot rest; and
a foot shifter assembly operatively coupled to the transmission to shift the gears, said foot shifter assembly comprising:
a toe and a heel pedal assembly, each said pedal assembly having upper and lower end portions, a medial portion, and a pedal extending away from the upper end portion for engagement, respectively, by the toe and heel of the rider,
first means for pivotably connecting the medial portion of the toe pedal assembly to the foot rest at a forward end thereof and for rotation about a first pivot axis,
second means for pivotably connecting the medial portion of the heel pedal assembly to the foot rest at a rearward end thereof and for rotation about a second pivot axis,
an actuating lever having upper and lower end portions with said upper end portion fixedly secured to said pivot shaft to rotate said shaft about said shaft pivot axis, and
connecting link means for connecting the lower end portions of said toe and heel pedal assembly and said actuating lever to one another, the connecting to the lower end portions of said toe and heel pedal assembly forming a parallelogram linkage that is free to swing below the foot rest following force applied to one or the other pedal by the toe or heel.

13. A gear shift assembly for a straddle vehicle including a power unit having a transmission assembly having a pivot shaft adapted to rotate about a pivot axis and plurality of gears for transmitting power to at least one wheel, the assembly comprising:
a foot shifter assembly operatively connected to the transmission assembly and selectively displaceable over a predetermined distance by a vehicle operator, said shifter assembly including a toe operated lever pedal and a heel operated lever pedal, each lever pedal having a medial portion mounted for rotation about a separate pivot axis, the pivot axis of said heel operated lever pedal being spaced and in parallel relation to the pivot axis of said toe operated lever pedal, and
a connecting link for transmitting torque from one pedal assembly to the other pedal assembly.

14. A kit for converting or modifying the original rocker-arm gear shift structure of a straddle motorcycle, the original motorcycle including a power unit having a transmission assembly, a pivot shaft, linkage connecting the pivot shaft to the transmission, a stationary foot rest attached to a bottom portion of the motorcycle structure, and an original toe and a heel operated shift pedal lever fixedly mounted to said pivot shaft, the kit comprising:
first and second pivot pins,
a mounting pin,
a heel operated replacement shift pedal lever, said replacement shift pedal lever having an upper end portion, a lower end portion, and a medial portion, said upper end portion including a pedal extending outwardly therefrom that is engageable by the heel of the rider, said medial portion including a bore for receiving the mounting pin, and said lower end portion including an aperture for receiving the first pivot pin,
a mounting bracket including a bore for receiving the mounting pin, said bracket being mountable to the rearward end portion of said foot rest and for mounting the replacement shift pedal lever for rotation about a pivot axis spaced from the pivot axis of the original toe operated shift lever pedal,
an actuating lever arm, said lever arm including an upper end portion configured to fixedly clamp about the pivot shaft and a lower end portion including an aperture for receiving the second pivot pin, and
a connecting link having forward and rearward end portions, each said end portion including an aperture for receiving a pivot pin, the forward end portion of the connecting link being connectible to the lower end portion of the actuating lever arm by passing said second pivot pin through the apertures formed in each, and the rearward end portion of the connecting link being connectible to the lower end portion of the heel operated shift lever by passing the first pivot pin through the apertures formed in each.

15. A kit for converting or modifying the original gear shift structure of a straddle motorcycle, the original motorcycle including a power unit having a transmission assembly, a pivot shaft, linkage connecting the pivot shaft to the transmission, a stationary foot rest attached to a bottom portion of the motorcycle structure, and an original toe and a heel operated shift pedal lever fixedly mounted to said pivot shaft, the kit comprising:

a pair of mounting pins, three pivot pins, a toe and a heel operated replacement shift pedal lever, each replacement shift lever pedal lever including an upper end portion, a lower end portion, and a medial portion, each said upper end portion including a pedal extending outwardly therefrom that is engageable, respectively, by the toe and the heel of the rider, each said medial portion including a bore for receiving a respective mounting pin, and each said lower end portion including an aperture for receiving a respective pivot pin, a first and a second mounting bracket, respectively, for mounting the toe and the heel operated replacement shift pedal lever to a respective opposite end portion of the foot rest, each said bracket including a bore for receiving a respective mounting pin and the bores defining spaced pivot axes for the replacement shift pedal levers, an actuating lever arm, said lever arm including an upper end portion configured to fixedly clamp about the pivot shaft and a lower end portion including an aperture for receiving a pivot pin, and first and second connecting links each having first and second end portions with each said end portion including an aperture for receiving a pivot pin, the first end portions of the connecting links being connectible to the lower end portion of the actuating lever arm by a pivot pin passing through the apertures formed in each, and the second end portions of the connecting links being connectible, respectively, to the lower end portion of the toe and the heel operated replacement shift pedal levers by a respective pivot pin passing through the apertures in each.

16. A method of converting a rocker gear shift assembly of a motorcycle transmission, the motorcycle including a pivot shaft, stationary foot rest having forward and rearward end portions, toe and heel operated pedal lever arms connected to one another and the pivot shaft and the motorcycle in a manner that back and forth rotation of one said pedal lever arm shifts the motorcycle transmission between higher and lower gears, the steps of the method comprising replacing the original toe and heel operated pedal lever arms with a replacement toe and a heel operated pedal lever arm, each replacement pedal lever arm including an upper portion provided with a pedal, a medial portion provided with a bore for receiving a mounting pin, and a lower portion provided with an aperture for receiving a pivot pin, attaching a mounting bracket, respectively, to a forward and rearward end portion of said foot rest, each said mounting bracket for mounting a respective of said replacement pedal levers and each provided with a bore for receiving a mounting pin, pivotably connecting the medial portions of said replacement pedal lever arms, respectively, to one and the other of said mounting brackets, said connecting including aligning the bores in respective of the replacement pedal lever arm and mounting brackets and passing a respective mounting pin through each respective pair of aligned bores, said connecting mounting the replacement pedal levers arms for pivoting movement about axes that are spaced from one another, fixedly connecting an actuating lever to the pivot shaft, said actuating lever including a lower end portion provided with an aperture for receiving a pivot pin and said connecting disposing said lower end portion below said foot rest, pivotably connecting the lower end portions of the toe operated replacement shift lever pedal, the heel operated replacement pedal lever, and the actuating lever to one another, said connecting including providing a respective pivot pin in the apertures of the pedal levers and the actuating lever.

\* \* \* \* \*